June 5, 1956  E. E. ANDERSON  2,748,520
FISH LURE
Filed March 5, 1954
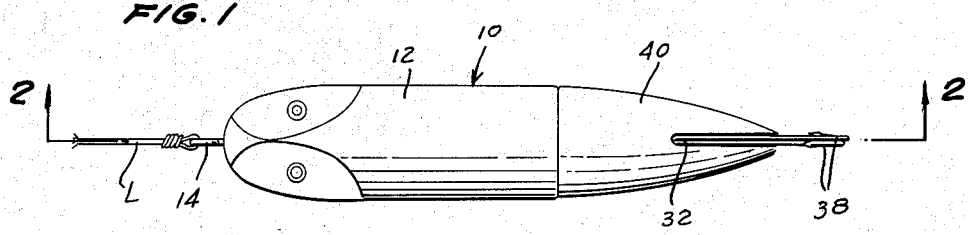
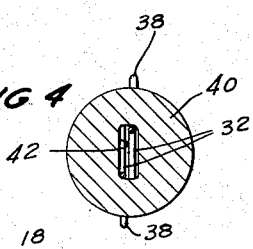
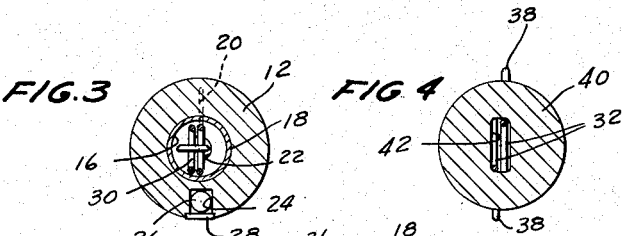
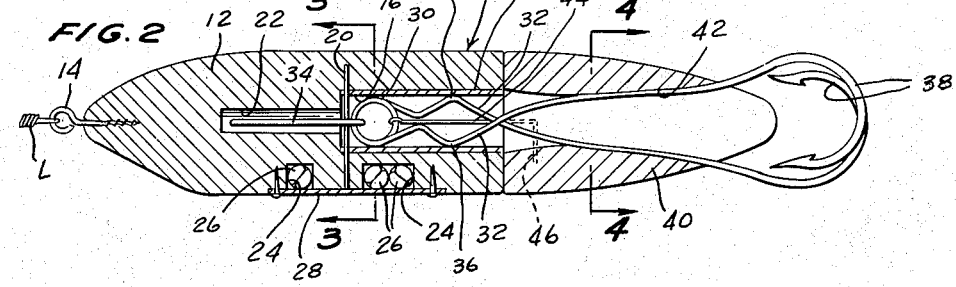
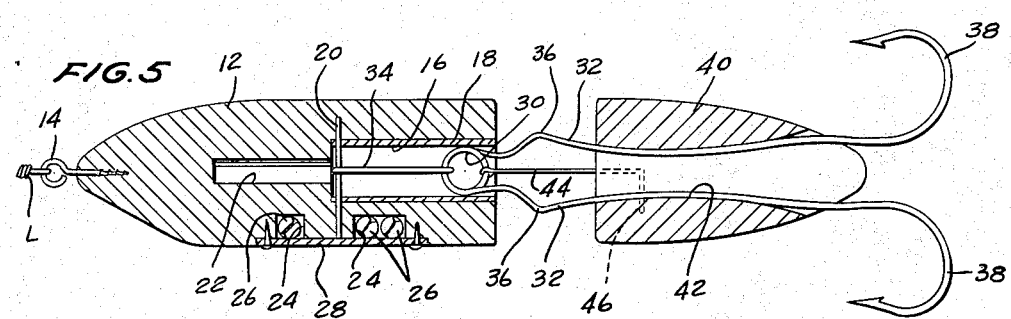
INVENTOR.
EDWIN E. ANDERSON
BY
McMorrow, Berman + Davidson
ATTORNEYS 2,748,520
Patented June 5, 1956

2,748,520
FISH LURE
Edwin E. Anderson, Minneapolis, Minn.

Application March 5, 1954, Serial No. 414,393

1 Claim. (Cl. 43—35)

This invention relates to a fish lure and has for its primary object to retain the fish hooks in an inactive position until such time as a fish strikes the lure.

Another object is to avoid entanglement of the lure among weeds and the possible snagging of the hooks on submerged objects.

A further object is to release the fish hooks for outward projection as soon as a fish strikes the lure and attempts to swallow it.

The above and other objects may be attained by employing this invention which embodies among its features a body simulating the head and body of a bait fish, an eye carried by the body and extending outwardly from one end thereof for connection to a fishing line, said body having a bore opening thereinto through the end thereof remote from the eye, a torsion spring mounted within the bore for movement longitudinally therein, outwardly biased spring legs carried by the torsion spring for movement through the end of the bore from a contracted position in which they extend into the bore to an expanded position in which they extend outside of the bore, barbed hooks carried by the legs for movement therewith from a contracted position in which they lie in overlapping relation to one another to an expanded position in which they project beyond opposite sides of the body, and means carried by the legs and operatively connected with the torsion spring for moving the torsion spring longitudinally within the bore.

Other features include means within the body and operatively connected with the torsion spring for arresting outward movement of the torsion spring when the legs extend substantially outside of the bore, and a body simulating the tail of a bait fish carried by the legs and operatively connected to the torsion spring for moving the torsion spring longitudinally within the bore.

In the drawings:

Figure 1 is a top plan view of a fishing lure embodying the features of this invention;

Figure 2 is a longitudinal sectional view on a slightly enlarged scale taken substantially on the line 2—2 of Figure 1;

Figure 3 is a transverse sectional view taken substantially on the line 3—3 of Figure 2;

Figure 4 is a transverse sectional view taken substantially on the line 4—4 of Figure 2; and Figure 5 is a view similar to Figure 2, showing the legs and barbed hooks in expanded position.

Referring to the drawings in detail, this improved fish lure designated generally 10 comprises a body 12, the external contour of which generally resembles that of a bait fish. Carried by the forward end of the body 12 and projecting longitudinally outwardly therefrom is an eye 14 to which a fishing line L is adapted to be attached. Entering the end of the body 12 remote from the eye 14 is a bore 16 in which is fitted a wear-resistant tube 18, and carried by the body 12 and extending transversely through the bore 16 adjacent the end thereof remote from that which opens through the end of the body 12 is a cross pin 20, the purpose of which will hereinafter appear. Formed within the body 12 and extending axially thereinto from the inner end of the bore 16 is a recess 22, the purpose of which will hereinafter appear. Longitudinally spaced chambers 24 are formed in the body 12 and open through the bottom thereof for the reception of weights 26 which are retained in the chambers 24 by a suitable cover plate 28. These weights 26 maintain the body 12 in an upright position when it is afloat.

Mounted for longitudinal sliding movement within the tubular member 18 is a torsion spring 30 carrying outwardly biased legs 32 which project outwardly through the open end of the bore 16, as will be readily understood upon reference to the drawings. Extending through the torsion spring 30 and encircling the cross pin 20 is an elongated loop 34 which serves as a stop to arrest outward movement of the spring 30 when it attains a position adjacent the outer open end of the bore 16. As illustrated, the legs 32 are provided adjacent the spring 30 with outwardly projecting cam elements 36 which, when the spring 30 is moved into the bore 16, engage the tube 18 and cause the legs 32 to contract, as illustrated in Figure 2. Carried by the legs 32 adjacent the ends thereof remote from the spring 30 are barbed hooks 38 which, when the legs 32 are contracted, as illustrated in Figure 2, overlie one another and when the legs are expanded as illustrated in Figure 5, project outwardly beyond opposite sides of the body 12.

Surrounding the legs 32 is a body or tail portion 40 having a slot 42 extending longitudinally therethrough in which the legs are free to move and cross one another, as illustrated in Figure 2. A suitable coupling member 44 is connected at one end to the spring 30 and at its opposite end is anchored as at 46 in the body 40 so as to cause the spring 30 to move in unison with the body 40 longitudinally within the tube 18.

In use, it will be evident that with the lure connected by the eye 14 to a fishing line L, it may be moved through the water and will resemble a bait fish. When the lure is struck by a fish and swallowed, it will be evident that owing to the pull on the line L, the body 12 will be moved longitudinally relative to the body 40 so that the cam members 36 will move out of engagement with the tube 18 to permit the legs 32 and barbed hooks 38 to expand a predetermined distance to the walls of the slot 42, as illustrated in Figure 5, so as to hook the fish. Obviously, after the fish has been landed, the lure may be reset by simply advancing of the body 40 toward the body 12 so as to enter the cam elements 36 into the tube 18 and contract the legs and hooks 38.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A fish lure comprising a body simulating the head and body portions of a bait fish; means on the head portion for attaching a fishing line thereto, the body portion having a longitudinal bore opening at one end upon one end of the body portion; a spring mounted in the bore for bodily movement longitudinally thereof between an inner position adjacent the other end of the bore and an outer position adjacent said one end of the bore; means in the bore for limiting the spring's movement in opposite directions beyond said positions; spring legs integrally connected at one end with the spring and extending longitudinally of the bore, said spring being under tension effective to bias the legs outwardly from one another, the wall of the bore engaging the legs in the inner position of the springs to prevent movement of the legs outwardly from one another, said legs projecting out of the bore for substantially their full lengths in the outer position of the spring so as to be freed of engagement by said wall; a tail portion formed separately from and shaped as an extension of the body, said tail portion having a longitudinal bore opening at opposite ends of the tail portion, said legs extending through the tail portion bore; hooks formed on the other ends of the legs; and means connecting the tail to the spring for movement conjointly therewith between said inner and outer positions, the wall of the tail portion bore limiting the legs in the outer position of the spring and tail portion against movement outwardly from one another beyond a predetermined extent, to correspondingly predetermine the maximum distance the hooks are spaced apart when the legs are spring biased outwardly.

References Cited in the file of this patent

UNITED STATES PATENTS

| | | |
|---|---|---|
| 2,225,965 | Ball | Dec. 24, 1940 |
| 2,242,592 | Noxon | May 20, 1941 |